US006445784B2

(12) United States Patent
Uppaluru et al.

(10) Patent No.: US 6,445,784 B2
(45) Date of Patent: *Sep. 3, 2002

(54) POINT-OF-PRESENCE CALL MANAGEMENT CENTER

(75) Inventors: Prem Uppaluru, Cupertino; Mukesh Sundaram, San Jose, both of CA (US)

(73) Assignee: Telera, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/796,060

(22) Filed: Feb. 27, 2001

Related U.S. Application Data

(63) Continuation-in-part of application No. 09/433,636, filed on Nov. 3, 1999, now Pat. No. 6,324,276, which is a continuation of application No. 09/249,395, filed on Feb. 12, 1999, now Pat. No. 6,011,844.

(51) Int. Cl.[7] .................. H04M 7/00; H04M 3/523; H04M 3/54; H04M 3/56; H04M 3/58
(52) U.S. Cl. ............... 379/220.01; 379/211.02; 379/221.01; 379/265.02; 379/266.04; 379/207.01; 379/212.01
(58) Field of Search ............... 379/201.01, 207.01, 379/211.01, 211.02, 212.01, 219, 220.01, 222, 230, 265.01, 265.02, 266.01, 266.04, 309, 901

(56) References Cited

U.S. PATENT DOCUMENTS

| | | |
|---|---|---|
| 36,051 A | 1/1862 | Adams et al. ............ 379/242 |
| 4,048,452 A | 9/1977 | Oehring et al. |
| 4,109,113 A | 8/1978 | Allison, Jr. et al. |
| 4,313,035 A | 1/1982 | Jordan et al. |
| 4,313,036 A | 1/1982 | Jabara et al. |
| 4,400,587 A | 8/1983 | Taylor et al. |
| 4,451,705 A | 5/1984 | Burke et al. |
| 4,510,351 A | 4/1985 | Costello et al. |
| 4,737,983 A | 4/1988 | Frauenthal et al. |
| 4,757,267 A | 7/1988 | Riskin |
| 4,788,715 A | 11/1988 | Lee |
| 4,792,968 A | 12/1988 | Katz ..................... 379/92.03 |
| 4,845,739 A | 7/1989 | Katz |
| 4,847,890 A | 7/1989 | Solomon et al. |
| 4,878,239 A | 10/1989 | Solomon et al. |
| 4,893,301 A | 1/1990 | Andrews et al. |
| 4,924,491 A | 5/1990 | Compton et al. |
| 4,930,150 A | 5/1990 | Katz |
| 4,932,046 A | 6/1990 | Katz |
| 4,939,773 A | 7/1990 | Katz |
| 4,953,204 A | 8/1990 | Cuschleg, Jr. et al. |
| 4,975,945 A | 12/1990 | Carbullido |
| 4,987,590 A | 1/1991 | Katz |
| 5,014,298 A | 5/1991 | Katz |
| 5,016,270 A | 5/1991 | Katz |
| 5,020,095 A | 5/1991 | Morganstein et al. |
| 5,048,075 A | 9/1991 | Katz |
| 5,073,890 A | 12/1991 | Danielsen |
| 5,073,929 A | 12/1991 | Katz |
| 5,091,933 A | 2/1992 | Katz |
| 5,109,404 A | 4/1992 | Katz et al. |
| 5,128,984 A | 7/1992 | Katz |
| 5,164,983 A | 11/1992 | Brown et al. ............ 379/265 |
| 5,168,515 A | 12/1992 | Gechter et al. |
| 5,181,236 A | 1/1993 | LaVallee et al. |
| 5,185,782 A | 2/1993 | Srinivasan |

(List continued on next page.)

Primary Examiner—Harry S. Hong
(74) Attorney, Agent, or Firm—Blakely, Sokoloff, Taylor & Zafman

(57) ABSTRACT

A point-of-presence (POP) call center system capable of answering, servicing, queuing and routing of calls at local points of presence to reduce communications costs and enhance operational efficiency for toll-free inbound call centers. The POP call center system includes a set of point-of-presence call center gateways distributed at points of presence close to the point of call origination.

35 Claims, 8 Drawing Sheets

U.S. PATENT DOCUMENTS

| | | |
|---|---|---|
| 5,185,787 A | 2/1993 | Katz |
| 5,206,903 A | 4/1993 | Kohler et al. |
| 5,218,631 A | 6/1993 | Katz |
| 5,224,153 A | 6/1993 | Katz |
| 5,251,252 A | 10/1993 | Katz |
| 5,255,309 A | 10/1993 | Katz |
| 5,259,023 A | 11/1993 | Katz |
| 5,271,058 A | 12/1993 | Andrews et al. |
| 5,278,898 A | 1/1994 | Cambray et al. |
| 5,291,550 A | 3/1994 | Levy et al. |
| 5,291,551 A | 3/1994 | Conn et al. ............ 379/266.09 |
| 5,291,552 A | 3/1994 | Kerrigan et al. |
| 5,297,197 A | 3/1994 | Katz |
| 5,299,259 A | 3/1994 | Otto |
| 5,311,574 A | 5/1994 | Livanos |
| 5,329,583 A | 7/1994 | Jurgensen et al. |
| 5,335,268 A | 8/1994 | Kelly, Jr. et al. |
| 5,349,633 A | 9/1994 | Katz |
| 5,351,285 A | 9/1994 | Katz |
| 5,359,645 A | 10/1994 | Katz |
| 5,365,575 A | 11/1994 | Katz |
| 5,384,841 A | 1/1995 | Adams et al. |
| 5,392,345 A | 2/1995 | Otto |
| 5,442,688 A | 8/1995 | Katz |
| 5,459,780 A | 10/1995 | Sand |
| 5,467,391 A | 11/1995 | Donaghue, Jr. et al. |
| 5,506,898 A | 4/1996 | Costantini et al. |
| 5,519,773 A | 5/1996 | Dumas et al. |
| 5,524,147 A | 6/1996 | Bean |
| 5,528,678 A | 6/1996 | Kaplan ........................ 379/201 |
| 5,553,120 A | 9/1996 | Katz |
| 5,561,707 A | 10/1996 | Katz |
| 5,633,924 A | 5/1997 | Kaish et al. |
| 5,684,863 A | 11/1997 | Katz |
| 5,684,870 A | 11/1997 | Maloney ................. 379/212.01 |
| 5,721,770 A | 2/1998 | Kohler |
| 5,787,156 A | 7/1998 | Katz |
| 5,793,846 A | 8/1998 | Katz |
| 5,815,551 A | 9/1998 | Katz |
| 5,828,734 A | 10/1998 | Katz |
| 5,835,576 A | 11/1998 | Katz ........................ 379/93.13 |
| 5,878,130 A | 3/1999 | Andrews et al. ....... 379/265.09 |
| 5,881,145 A | 3/1999 | Giuhat et al. ................ 379/207 |
| 5,884,032 A | 3/1999 | Bateman et al. .... 379/265.09 X |
| 5,960,073 A | 9/1999 | Kikinis et al. ......... 379/265.04 |
| 5,999,965 A | 12/1999 | Kelly .......................... 709/202 |
| 6,011,844 A * | 1/2000 | Uppaluru et al. ............ 379/220 |
| 6,026,087 A | 2/2000 | Mirashrafi et al. .......... 370/389 |
| 6,324,276 B1 * | 11/2001 | Uppaluru et al. ...... 379/207.01 |

* cited by examiner

POINT-OF-PRESENCE CALL MANAGEMENT CENTER

RELATED APPLICATIONS

This application is a continuation-in-part of application Ser. No. 09/433,636 filed Nov. 3, 1999, now U.S. Pat. No. 6,324,276, which is a continuation of application Ser. No. 09/249,395, filed Feb. 12, 1999, now U.S. Pat. No. 6,011,844.

FIELD OF THE INVENTION

The present invention relates to the field of telecommunication, and more particularly to management of toll free telephone calls.

BACKGROUND OF THE INVENTION

FIG. 1 is a functional diagram of a premises call center connecting an end user 116 to a business call center 108 via an originating Local Public Switched Telecommunications Network (PSTN) 106, a Long Distance Network 114 and terminating Local PSTN 106. Business call centers are typically put together by integrating multiple system components into a complete business solution to answer, service, queue and route inbound customer calls. These system components can include a Private Branch Exchange (PBX) 102, an Automatic Call Distributor (ACD) 112 and an Interactive Voice Response (IVR) System 110 in addition to customer service or help desk applications for the call center agents 104. Many call centers deploy a Computer Telephony Integration (CTI) server providing intelligent call routing. Traditionally, different vendors supplied the different system components and systems integrators pulled the components together into a solution.

FIG. 2 is a functional diagram of a network-based call center connecting an end user 116 to a business call center 108 via an originating Local PSTN 106, a Long Distance Network 114 and a terminating Local PSTN 106. Network call centers may include a Switch 122, an ACD 112 and an IVR 110 within the Long Distance Network 114 and provide call answering, servicing and queuing services. These services are built on call center solutions residing inside the network that aggregate the services across multiple business customers on the shared physical configurations. Many call center vendors have targeted this fast growing network call center market with PSTN integrated systems and solutions.

The call centers depicted in FIGS. 1 and 2 each share the disadvantage that long distance toll charges accrue while a call is on hold awaiting connection to a call center agent. Long distance toll charges also accrue while the caller is interacting with the Interactive Voice Response.

SUMMARY OF THE INVENTION

A method and system for managing a toll free long distance call to a business call center are disclosed. A toll free long distance call to a business call center is redirected to a local call center. The redirected toll free call is automatically answered in the local call center to determine whether long distance connection to the business call center is necessary. If connection to the remote call center is necessary, the redirected toll free call is bridged with a telephone connection in the business call center via a long distance network.

BRIEF DESCRIPTION OF THE DRAWING

The present invention is illustrated by way of example and not limitation in the figures of the accompanying drawing in which like references indicate similar elements and in which.

DETAILED DESCRIPTION

Figure 1:
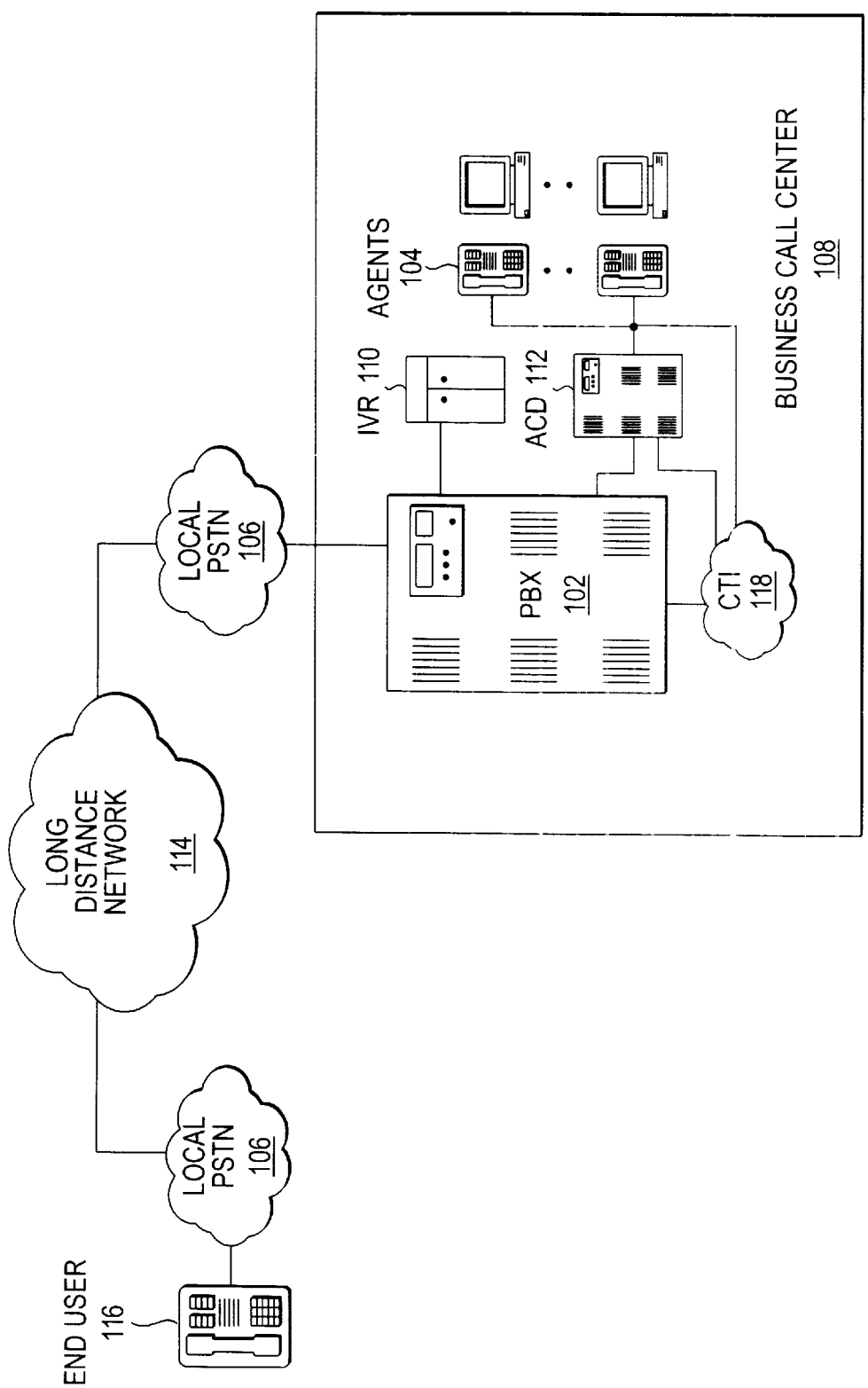
FIG. 1 is a schematic diagram of a prior art call center configuration with PBX, ACD and IVR systems located at the business call center.
Figure 2:
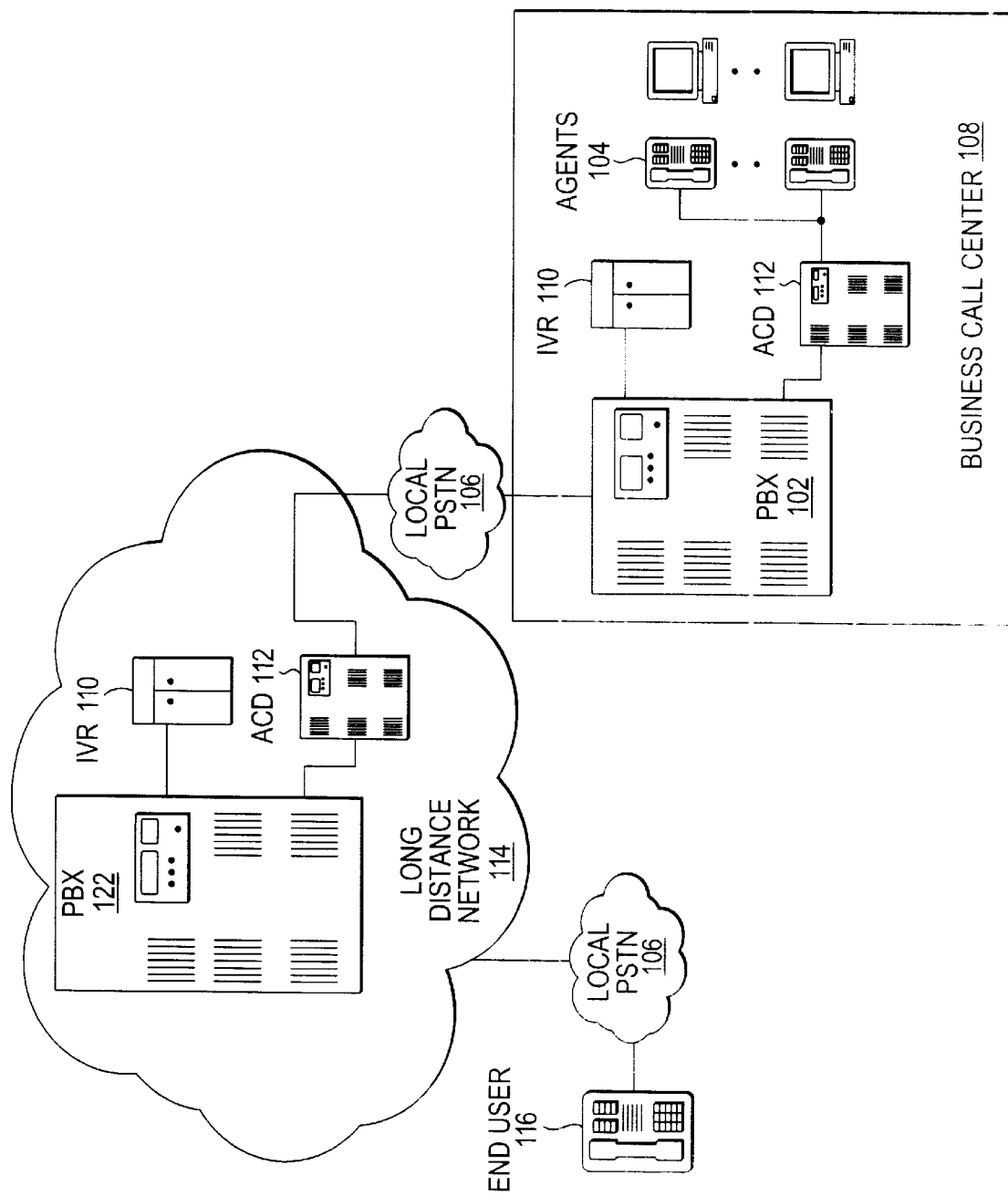
FIG. 2 is a schematic diagram of a prior art network based call center configuration with Switch, ACD and IVR systems located inside the long distance network.

Although the present invention is described below by way of various embodiments that include specific structures and methods, embodiments that include alternative structures and methods may be employed without departing from the principles of the invention described herein.

OVERVIEW OF EMBODIMENTS

In general, embodiments described below feature a global call center system capable of answering, servicing, queuing and routing of calls at local points of presence to reduce communications costs and enhance operational efficiency for toll-free inbound call centers. In at least one embodiment, the global call center system includes a set of point-of-presence call center gateways distributed at points of presence close to the point of call origination that are interconnected by a virtual private network to premises call center gateways at business locations where the call centers reside.

A point-of-presence (POP) call center gateway according to embodiments of the invention is capable of intercepting and answering inbound toll-free telecommunications calls at or near the point of call origination. The POP call center gateway is also capable of providing interactive voice response based automated service, holding and queuing the calls until operators are available to service the call, and playing music or customized announcements to the caller while the call is being held. The POP call center gateway is further capable of requesting connected premises call center gateways to originate proxy calls on its behalf, monitoring call progress and routing the locally queued calls to the premises call center just in time before the operator picks up the call.

A premises call center gateway according to embodiments of the invention is capable of receiving proxy call origination requests from connected POP call center gateways and in response, generating and presenting proxy calls to the automatic call distributor (ACD) at the premises call center. The premises call center gateway is further capable of monitoring the progress of such proxy calls within the ACD for operator availability, communicating with the appropriate POP call center gateways for just in time call delivery to the selected operator, and bridging the calls between the POP call center gateways and the premises ACD.

Embodiments of the invention include a system and method for operating the global call center system where in a customer calls an advertised inbound toll-free number to reach a business call center. The call is intercepted at the local central office or tandem switch and routed to a local POP call center gateway using the point of call routing capability of a Service Management System/800 (SMS/800) database system and signaling system 7 (SS7) protocols. The local central office or tandem switch uses the SMS/800 database system to translate the single inbound toll-free number for the business call center into a matching local phone number terminating at the local POP call center gateway. The local central office or tandem switch identifies to the local POP call center gateway the translated called party number and optionally the calling party number. The call is terminated at the local POP call center gateway, which answers the call with an automated voice response system.

The POP call center gateway uses the translated called party number to identify and run a matching interactive voice response application customized to the business call center. The customized interactive voice response application can either be replicated at each local POP call center gateway or dynamically accessed from the business call center just in time as the call is answered and serviced. In either case, the POP call center gateway responds to the incoming call with an interactive voice response application customized to the business call center that was called by the customer. This custom interactive voice response application then services the customer call by providing appropriate prompts and menus, gathering input from the customer and interactively providing automated service. The custom interactive voice response application uses a virtual private network (connecting the POP call center gateways to one or more business premises call center gateways) to securely access the customer application and/or data at the corresponding business call center to appropriately service the calling customer.

If the call is to be held waiting for an available call center agent, the POP call center gateway holds and queues the call locally while requesting the corresponding premises call center gateway to insert a proxy call into the business call center's ACD. The POP call center gateway, optionally plays music and/or periodic prompts and messages to the caller while the call is on hold. The corresponding premises call center gateway inserts a proxy call in the business call center's ACD and starts monitoring its progress through the ACD queue.

When the proxy call reaches the head of the queue and is about to be answered by a live call center agent, the premises call center gateway alerts the waiting POP call center gateway. The waiting POP call center gateway then routes the locally queued call to the premises call center gateway over an appropriate long distance network, either a public/private switched telephone network or a public/private Internet Protocol (IP) telephony network. The corresponding premises call center gateway receives the routed call, matches it with the corresponding proxy call to the business call center ACD and bridges the incoming call to the proxy call.

A selected call center agent at the business call center then answers the call and provides expected customer service to the customer. Finally, when the customer or the call center agent hangs up the call, the appropriate call center gateway detects the event and alerts the matching counter-part gateway and both gateways terminate the call.

SYSTEM DESCRIPTION

Figure 3:
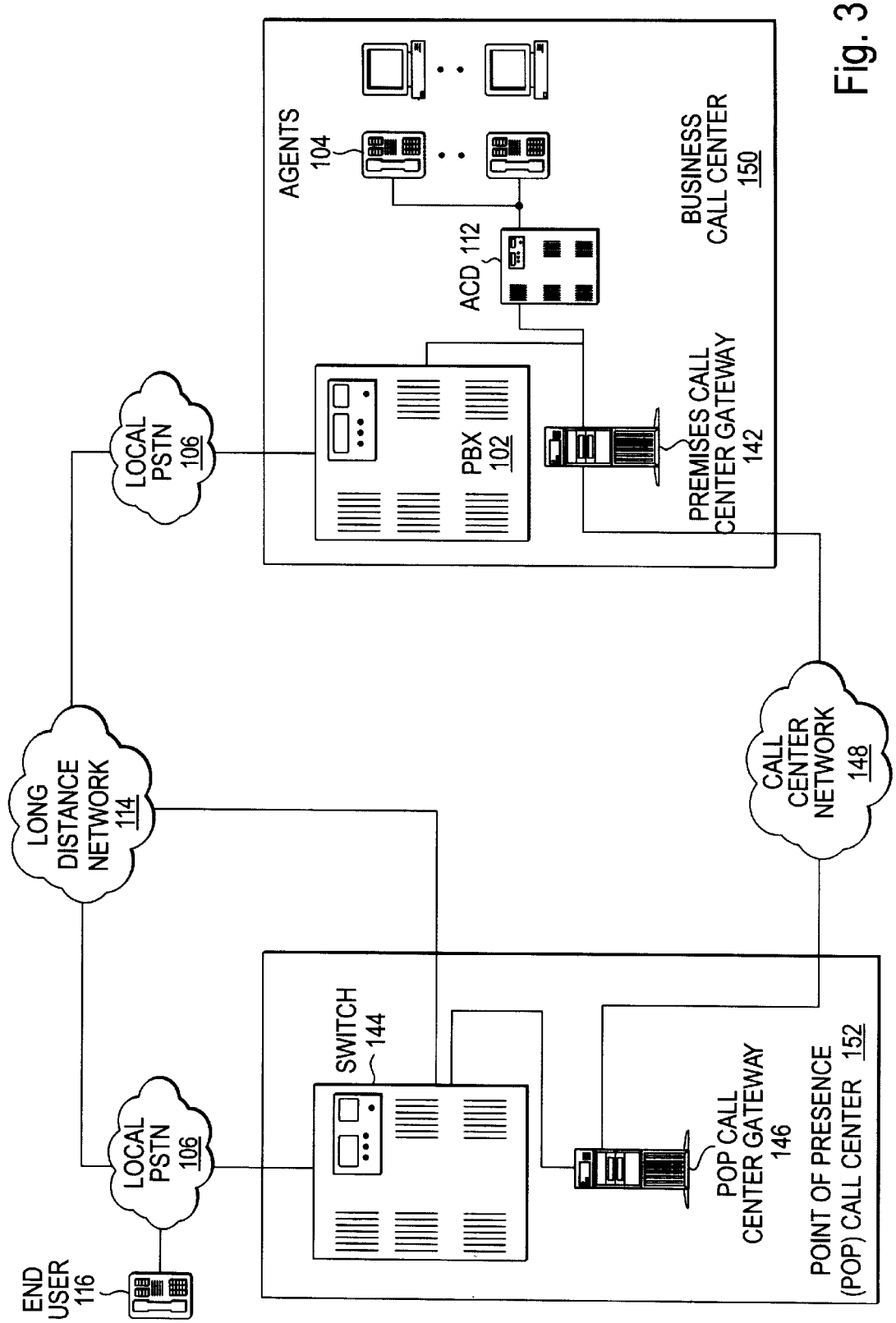
FIG. 3 is a schematic diagram of a POP Call Center configuration according to an embodiment that includes Switch and POP Call Center Gateway located at points of presence connected to Premises Call Center Gateway over a Call Center Network.

FIG. 3 is a functional diagram of a point-of-presence (POP) call center system in accordance with at least one embodiment of the present invention wherein the end user 116 is connected to the POP-enabled business call center 150 via an originating Local PSTN 106, a Long Distance Network 114 and a terminating Local PSTN 106.

The POP call center system extends the conventional premises and network based call center systems to a fully distributed call center system with multiple points of presence. The POP call center system is capable of locally answering, servicing, queuing and routing inbound toll-free calls to business call centers thereby saving on communications costs and increasing operating efficiency.

The POP call center system consists of one or more POP call center gateway servers 146 distributed at one or more points of presence 152 close to the points of call origination. These POP call center gateway servers 146 are connected by one or more call center networks 148 to premises call center gateway servers 142 at one or more POP-enabled business call centers 150. The POP call center gateway server 146 is connected to a Switch 144 enabling it to receive and originate calls on the local PSTN 106. The POP call center gateway servers 146 are further connected to a switched or dedicated access public telecommunications network 114 enabling long distance voice communications with connected premises call center gateway servers.

A POP-enabled business call center 150 consists of one or more premises call center gateway servers 142, one of which would be selected dynamically at the time of handling of an incoming call at a POP call center gateway.

Figure 4:
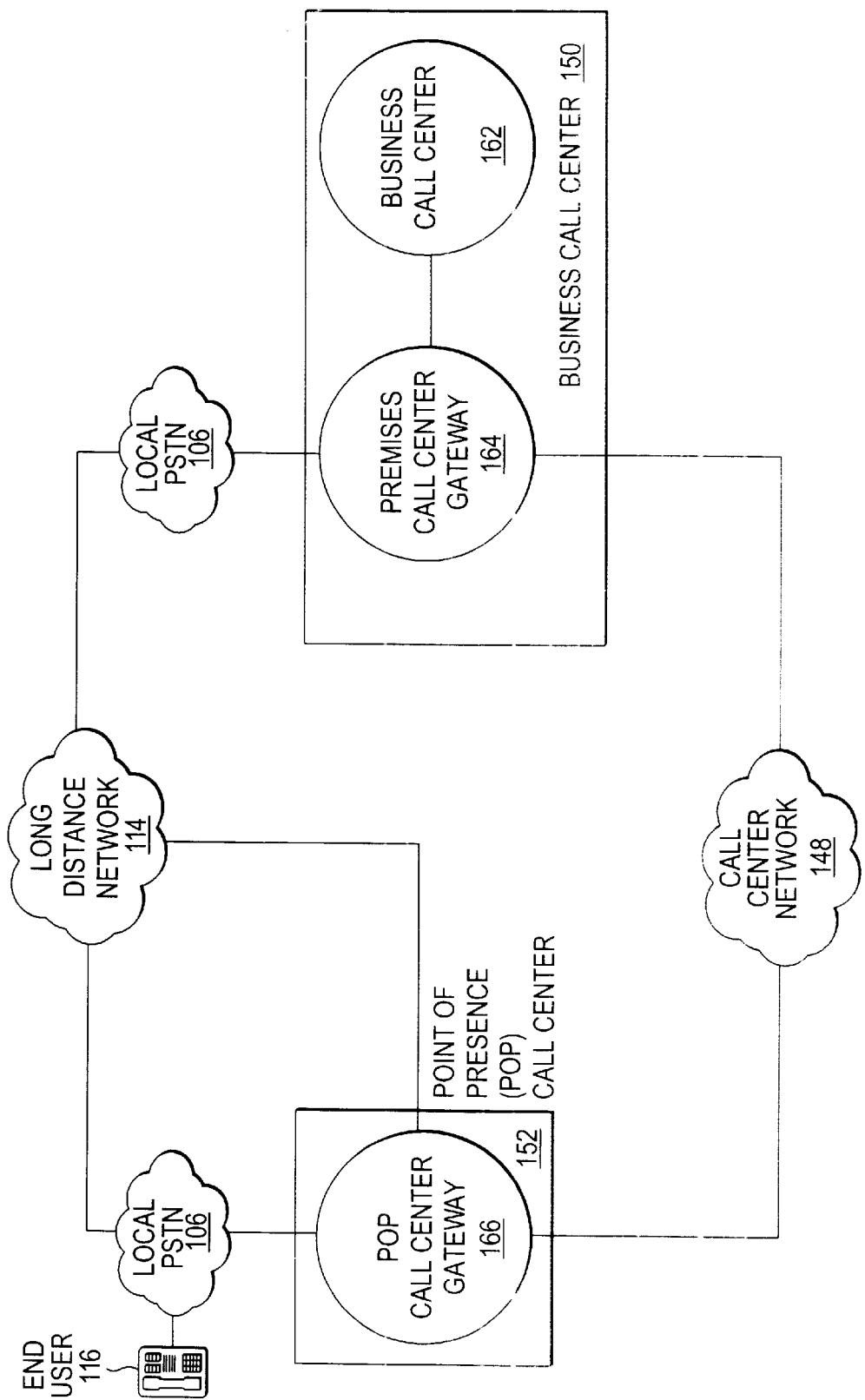
FIG. 4 is a schematic diagram of components of a POP Call Center system according to one embodiment, including a POP Call Center Gateway, a Premises Call Center Gateway and a Call Center Network of a business.

Referring to FIG. 4, a POP call center gateway 166 intercepts and answers inbound toll-free calls at or near their point of call origination. In addition, it provides automated service with interactive voice response applications, holds and queues the calls until appropriate operators are available to service the call, and plays music or customized announcements to the caller while the call is on hold. If a call is queued, this gateway further requests a corresponding premises call center gateway 164 to originate a proxy call at the call center ACD on its behalf and monitor the progress of the queued call. When the premises call center gateway 164 alerts the POP call center gateway 166, the POP call center gateway 166 routes the locally queued call to the premises call center 150 just in time before the operator picks up the call.

The premises call center gateway 164 responds to requests for call center information and applications from POP call center gateways 166, accesses the requested information and applications from premises call center database systems and supplies it to the requesting POP call center gateway 166. The premises call center gateway 164 further receives proxy call origination requests from the POP call center gateways 166 and generates proxy calls on their behalf to the premises call center automatic call distributor (ACD). The premises call center gateway 164 then monitors the progress of proxy calls within the ACD for operator availability, communicates with the appropriate originating POP call center gateway 166 for just in time call delivery to the selected operator, and bridges the calls between the POP call center gateway 166 and the premises ACD.

Figure 4A:
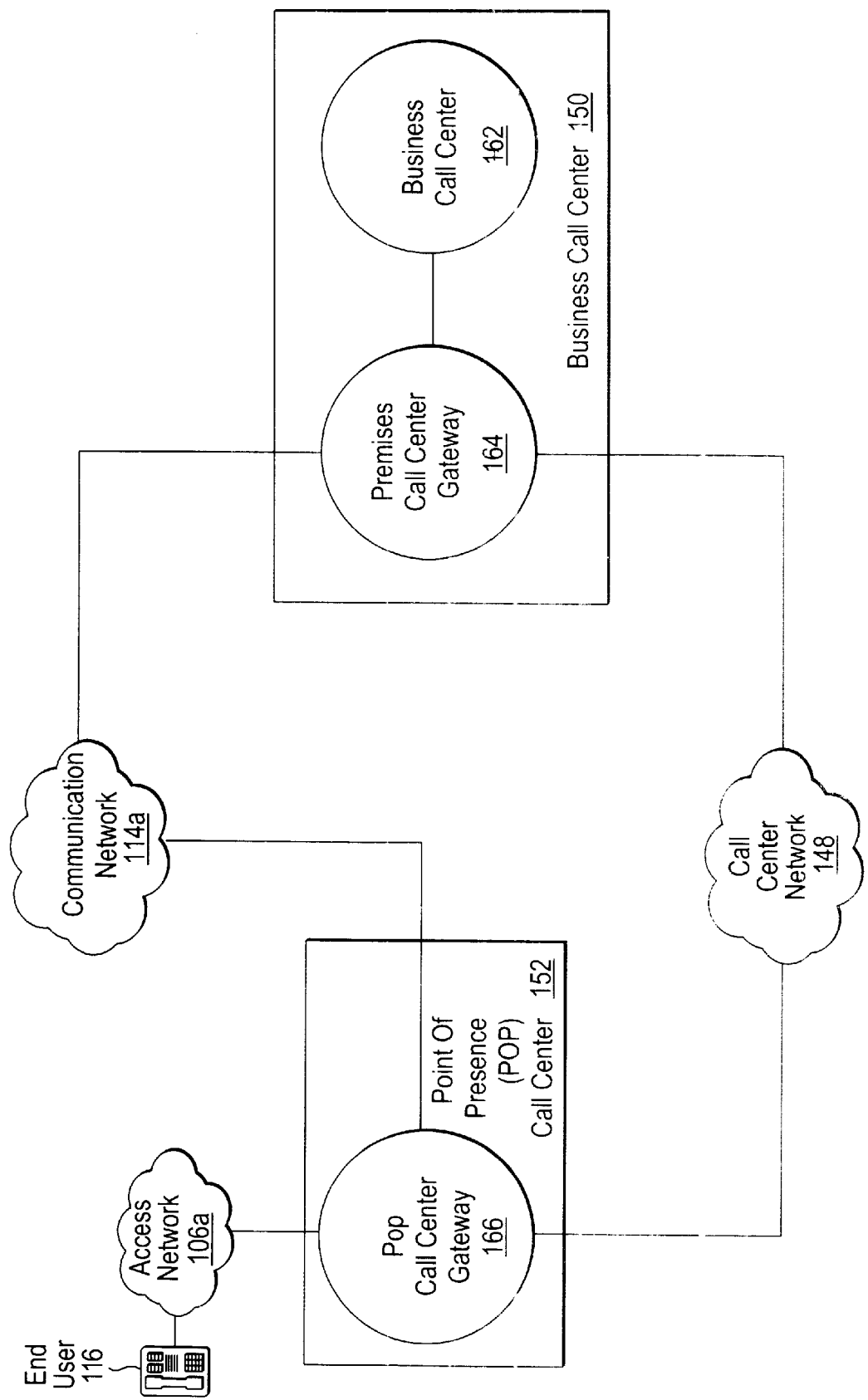
FIG. 4A illustrates an alternative network arrangement for the system shown in FIG. 4.

Referring briefly to FIG. 4*a*, a more generalized view of a system that includes a POP call center gateway 166 is shown. In this embodiment, inbound calls to POP call center gateway are received through access network 106*a*. Access network 106*a* may be a local PSTN as discussed above, or it may be any other form of telecommunications (or even data communications) network, such as a wireless communications network, (e.g., a wireless local loop), a partially-wired and partially-wireless communications network, a long distance telecommunications network, a digital subscriber line (DSL) communications network, or combinations of any such networks. Similarly, communication network 114*a* need not be just a long distance telecommunication network, but instead be any (or combinations of any) of the foregoing types of networks. All other features and functions of the system remain as described above and throughout this description it should be appreciated that access network 106*a* may be substituted for a local PSTN and communications network 114*a* may be substituted for a long distance (and/or, long distance plus local) communication network. Further, the inbound call from the end user 116 need not be a toll free call.

Figure 5:
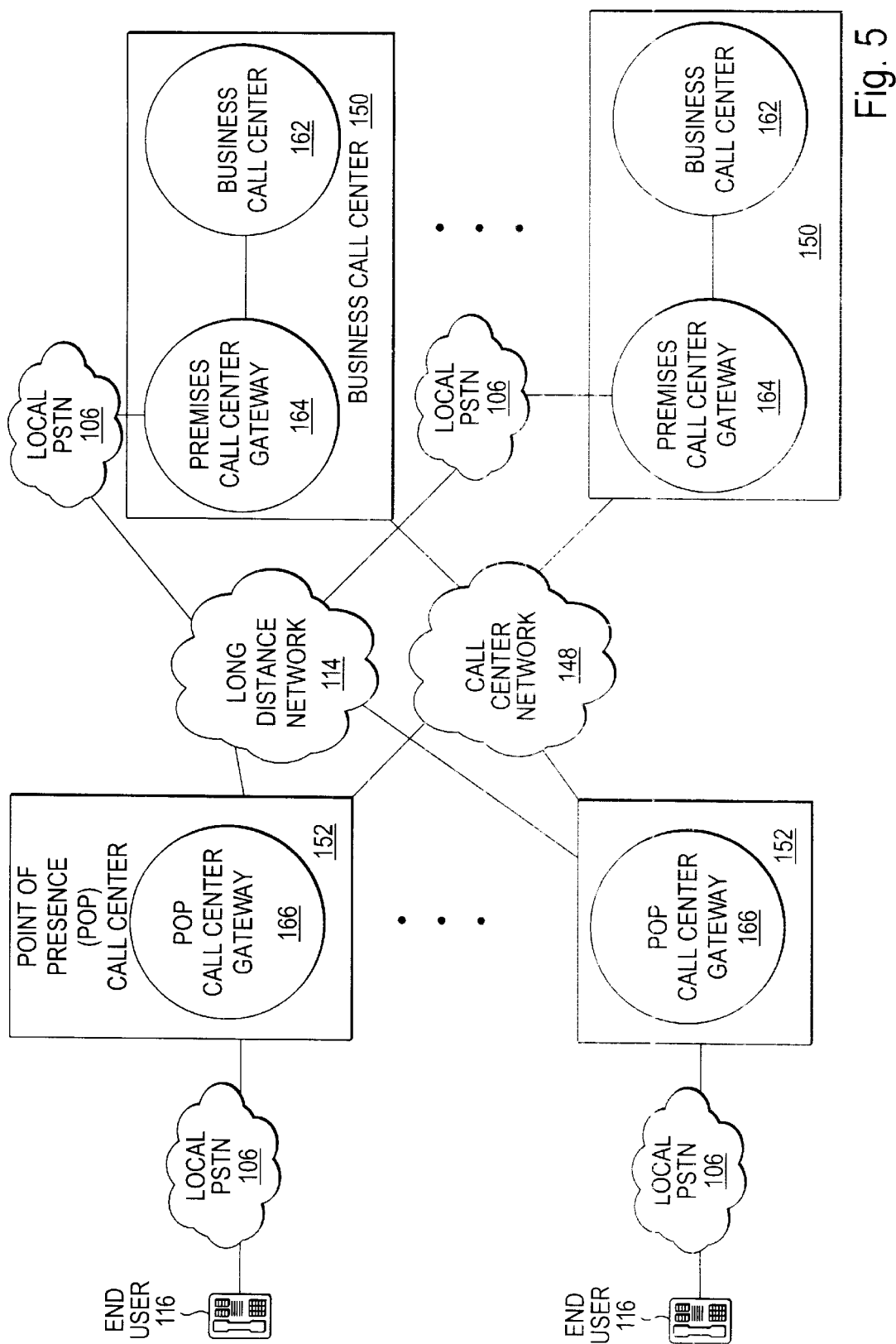
FIG. 5 is a schematic diagram of components of a POP Call Center system according to an embodiment that supports a single business with multiple call center sites connected with multiple POP Call Centers.
Figure 6:
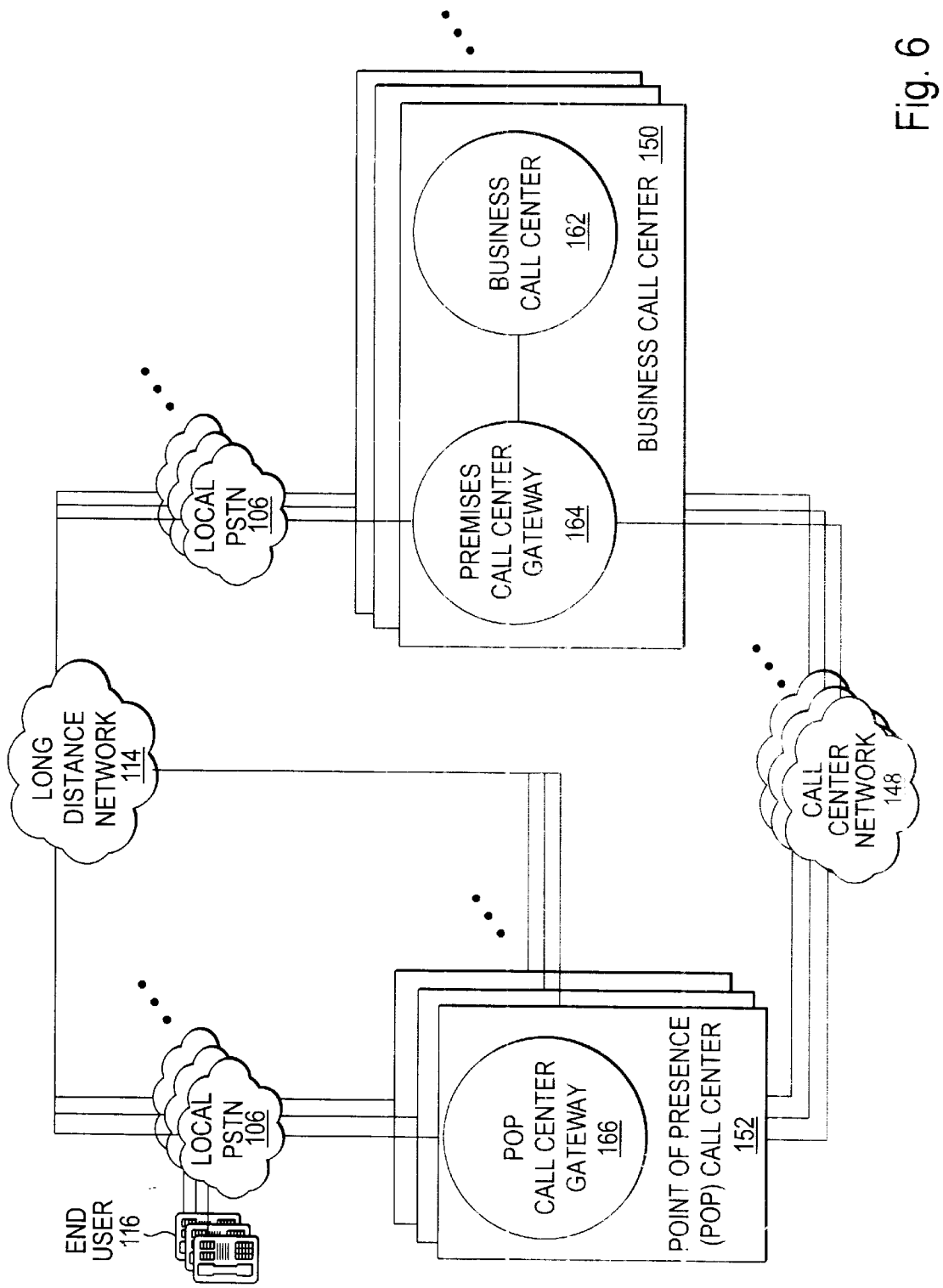
FIG. 6 is a schematic diagram of components of a POP Call Center system according to an embodiment that supports multiple business call centers connected to multiple POP Call Centers.

Referring to FIG. 5, a call center network according to one embodiment is a virtual private network connecting the POP call center gateways to one or more premises call center gateways all of which belong to a single business call center. A virtual private network offers industry standard connection and transport protocols such as ATM, Frame Relay or Internet Protocol (IP) for secure and private data communications between connecting entities with optional quality of service guarantees. Referring to FIG. 6, each POP call center gateway can be part of multiple such call center networks one for each business call center that it serves. POP call center gateways use a call center network to connect to corresponding premises call center gateways and access appropriate interactive voice response applications and information as well as request proxy call origination and monitoring of call progress. A call center network can optionally support voice communications over ATM, Frame Relay or IP protocols. In such a case, the POP call center gateways can use the call center network as an alternative long distance voice communications network when calls are bridged across the premises call center gateway to the business call center ACD.

Figure 7:
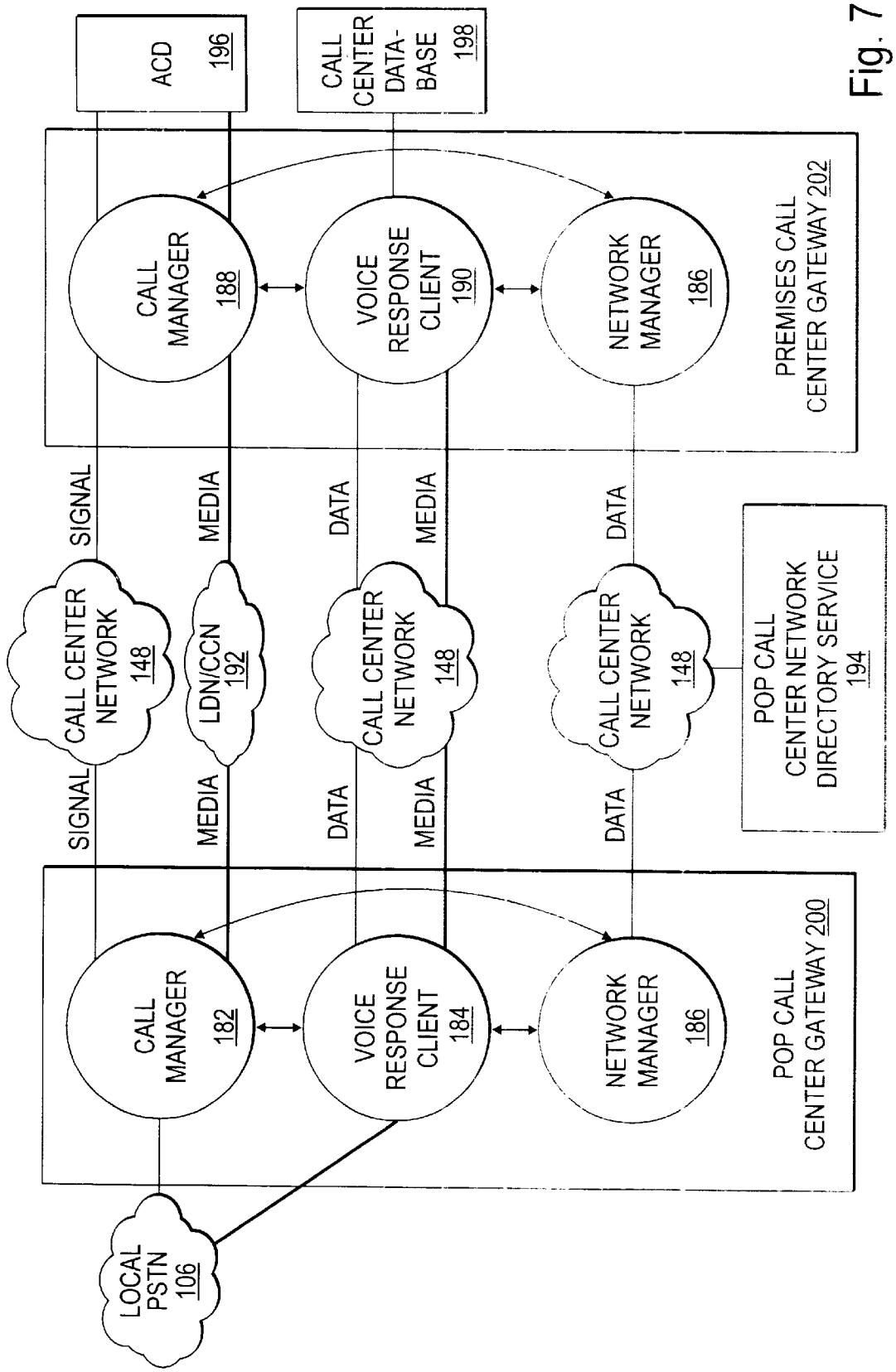
FIG. 7 is a schematic diagram of POP Call Center System software modules and their interconnections according to one embodiment.

Referring to FIG. 7, all the call center networks connect to a global POP call center network directory service 194 for translating the called party number of an incoming call at a POP call center gateway to the network address of a corresponding premises call center gateway. For each called party number at each POP call center, the POP call center network directory maintains a service record containing at a minimum the corresponding premises call center gateway network address. In one preferred embodiment of the invention, a POP call center network directory service uses a network directory based on the Internet standard Lightweight Directory Access Protocol (LDAP).

A POP call center gateway further comprises POP call manager 182, POP voice response client 184 and POP network manager 186 software modules hosted on an industry-standard computer telephony server. A computer telephony server consists of an industry standard server computer such as an Intel PC server or Sun Microsystems server enhanced with telephony and voice processing capabilities and running an industry standard applications server operating system such as Microsoft Windows NT or Sun Microsystems Solaris. In an alternative preferred embodiment, a POP call center gateway can comprise an IP telephony gateway server and a separate applications server connected over a high-speed local area network. An IP telephony gateway is capable of translating traditional circuit switched voice communications to packet switched communications and transporting voice over long distance using IP networks. In such a configuration, the applications server hosts the POP call manager, POP voice response client and POP network manager modules which interact with the IP telephony gateway for voice communications and signaling.

A premises call center gateway further comprises premises call manager 188, premises voice response server 190 and premises network manager 186 software module hosted on an industry standard computer telephony server similar to the one hosting the POP call center gateway. In an alternative preferred embodiment, a premises call center gateway can comprise an IP telephony gateway server and a separate applications server connected over a high-speed local area network. In such a configuration, the applications server hosts the premises call manager, premises voice response server and premises network manager software modules which interact with the IP telephony gateway for voice communications and signaling.

For each participating business call center network, the POP call center system assigns a unique universally accessible inbound toll-free number. This number can be a previously existing 800/888 toll-free access number of a participating business call center. Depending on the geographic areas in which it wishes to receive POP call center service, the participating business call center chooses one or more POP call centers to be connected to its call center network. The POP call center system then assigns a distinct direct inward dial (DID) number for each POP call center connected to the business call center network. This DID number, also referred to as the POP call center called party number, uniquely identifies at each POP call center the specific business call center to which an incoming call is targeted. The POP call center gateway uses this called party number to identify the network address of the corresponding premises call center gateway.

The POP call center system uses the point of call routing capability of the SMS/800 database management system to route toll-free inbound calls originating in a local PSTN to the nearest and most cost effective POP call center capable of handling these calls. Local exchange carriers use SMS/800 database management system to intelligently route inbound toll-free calls to appropriate inter exchange carriers or other competitive local exchange carriers. For each inbound toll-free call targeted at a toll-free number, the responsible central office switch or tandem switch requests routing instructions from the SMS/800 database management system utilizing Signaling System 7 (SS7) protocols. The local PSTN switch then routes the call to the appropriate carrier based on the response received from the SMS/800 database management system. The POP call center system programs the SMS/800 database management system to instruct the local PSTN switch to route the call to the appropriate POP call center using its uniquely assigned DID number matching the originally called toll-free number.

A POP call center gateway receives and terminates calls originating from a connected local public switched telecommunications network (PSTN) enabling it to locally answer, service and queue the calls. A POP call center gateway can be connected to local PSTN at a central office switch, a tandem switch or a LATA tandem switch depending on local telecommunications traffic patterns and geographic location of the PSTN switches. It should be noted that the type and location of PSTN switch to which POP call center gateway is connected determines the local communication costs and geographic coverage for the inbound toll-free calls. In general, connection at a higher level of the PSTN switch results in broader geographic coverage and higher local communications costs.

EXEMPLARY PSEUDO CODE LISTINGS

Pseudo code listings A–D are appended to and form part of this specification. The listings present pseudo code representations of the interactions between the POP modules and the premises modules, particularly the call manager and voice response components. The functionality of each module is described as a set of messages received by the module from other modules and the actions taken by the module in response to these messages. Each module maintains state through private data structures that are identified in the pseudo code.

POP Call Manager

Referring to pseudo code listing A, appended hereto, a POP call manager receives an incoming toll-free call through the message INCOMING_CALL and requests the local POP network manager to identify the called party number and locate the business call center to which the call is directed by calling TranslateNumberToAddress. The POP network manager implements the translation. The POP call manager determines whether the corresponding call center is able to receive additional incoming calls by sending the message, ALLOCATE_PROXY_CALL, to the premises call manager. If the corresponding call center is able to receive additional incoming calls, the POP call manager attaches the incoming call on an available voice port and transfers the call to the POP voice response client by calling CreateVoiceResponseClientInstance with the operation parameter, ANSWER. If the corresponding call center is unable to receive further calls, the POP call manager generates a busy signal to the local PSTN. If the POP voice response client transfers the call back to it for queuing through the message QUEUE_CALL, the POP call manager requests the corresponding premises call center gateway to originate a proxy call at the premises ACD on its behalf by sending the message PLACE_PROXY_CALL. Upon completion, the POP call manager places the call on hold by transferring the call to the POP voice response client by calling CreateVoiceResponseClientInstance with the operation parameter, HOLD. When the premises call manager alerts the POP call manager that the call is about to be answered by an operator through the message AGENT_READY, the POP call manager terminates the voice response client by sending it the message, TERMINATE. This results in the voice response client passing control of the call back to the POP call manager through the message TRANSFER_CALL. The POP call manager then routes the call over an appropriate long distance voice communications network to the premises call center gateway by calling PlaceCall, bridging the inbound call with the newly placed call by calling BridgeCall. At any time during the call, if the POP call manager receives a termination message USER_TERMINATION from the POP voice response client, which sends such a message if the user terminates the call, it notifies the premises call manager of the event by sending the message TERMINATE_CALL. The POP call manager may also receive a notification from the premises call manager that the agent has terminated the call, through the message AGENT_TERMINATION. In either case, it performs clean up of the incoming and long distance voice ports, and all state data associated with the incoming call.

POP Voice Response Client

Referring to pseudo code listing B, appended hereto, a POP voice response client receives and responds to instructions from the local POP call manager to answer and service an incoming call to a specified business call center. Based on the instructions as well as the configuration options for the specified business call center, the POP voice response client locates and connects to the premises voice response server on the matching premises call center gateway. Thereafter, the POP voice response client interacts with the corresponding premises voice response server to run an interactive voice response application customized to the business call center. Such interactions include accessing the necessary voice prompts, menus, forms, scripts, data and applications from the premises voice response server. It should be noted that the interactive voice response application can be customized to the specified business center by previously loading all the necessary voice prompts, menus, forms, scripts, and applications at the POP call center gateway. This approach would require full replication of all business applications at all POP call centers, which is wasteful in utilization of resources and expensive due to operational complexity. Thus, while business applications may be replicated at all POP call centers in certain embodiments, the envisioned approach is to use a distributed voice user interface manager that adapts dynamically to the required interactive application customized to the specified business call center.

A preferred embodiment of the invention features a POP voice user interface manager embedded in the POP voice response client enabling it to dynamically adapt to the specified business call center's interactive voice response application without having to locally store all business call center applications at each POP call center. A POP voice user interface manager dynamically accesses voice prompts, menus, forms, scripts and applications customized to a specified business call center as needed from the corresponding premises voice response server. The POP voice user interface manager and the corresponding premises voice response server use a specialized request/response protocol such as the Internet standard Hyper Text Transfer Protocol to access the distributed resources. Optionally, the POP voice user interface manager and the corresponding premises voice response server may use the Internet standard Hyper Text Markup Language (HTML) or its extensions such as Extended Markup Language (XML) to access conveniently packaged units of information or application across the call center virtual private network. The POP voice response client optionally stores frequently used and rarely modified voice prompts and messages locally in a network cache to improve access efficiency. However, the voice response client can also access voice prompts, messages and other audio files in real-time using Internet streaming protocols such as Real-time Transfer Protocol (RTP) across the call center virtual private network.

The POP call manager creates an instance of the voice response client, and passes an incoming call to it to handle, by specifying the operation parameter ANSWER. This results in the voice response client contacting the voice response server at the premises call center gateway by calling AccessScript, with the parameter ANSWER_SCRIPT, to receive the script to execute. This script is passed to ExecuteScript, which processes and executes the script which typically interacts with the user presenting announcements and menu options and accepts user input via touch tones keys on the phone or speech recognition. Thereafter, when an external event occurs, the voice response client processes the event and takes actions. When user input is received through the message USER_INPUT, the input is decoded by calling ProcessUserInput, which determines what action should be performed in response to the input. This is codified by the returned result, UserRequest, which is passed to the voice response server to process by calling AccessScript. AccessScript returns back to the voice response client a new script to process, which is once again passed to ExecuteScript. If the user input is a request for operator assistance, the script returned by the business call center application running on the premises voice response server instructs the POP voice response client to transfer the call back to the local POP call manager to be queued awaiting availability of a call center agent. The POP voice response client sends the message, QUEUE_CALL, to the POP call manager. The POP call manager, as described earlier, queues the call and requests the corresponding premises call manager to generate a proxy call at the business call center ACD on its behalf. The POP call manager also creates an instance of the voice response client with the operation parameter HOLD. The general operation of the voice response client in this case is identical to the case of ANSWER, except that the first script, which is requested by calling AccessScript, is with the parameter HOLD_SCRIPT. This parameter serves to distinguish the script executed by the voice response client when the user is on hold from when the user is going through self-service.

When the control events USER_HANGUP, which is generated when a user hangs up the phone, or TERMINATE, which is sent by the POP call manager to terminate user interaction, occur, the voice response client responds by sending the messages USER_TERMINATION and TRANSFER_CALL to the POP call manager.

While the user is awaiting an available agent, the voice response client interacts with the voice response server to acquire status updates regarding the progress of proxy calls that the premises call manager had originated. Based on this information and call center configuration options, the voice response client alerts the waiting caller with status update messages. The script selected by HOLD_SCRIPT controls this behavior.

A POP network manager receives requests from the local POP call manager to translate the called party number of an incoming call to the network address of the premises call center gateway by a call to its procedure TranslateNumberToAddress. The POP network manager in turn requests the global POP network directory service to retrieve the entry corresponding to the specified called party number. The POP network manager accesses the network address of the corresponding premises call center gateway from the retrieved entry and returns it to the requesting local POP call manager. It should be noted that the global POP network directory service could be implemented using a single directory server or a collection of directory servers with replicated data for additional reliability. It should also be noted that the directory servers could be co-located at the POP call centers. As noted earlier, the directory service can be implemented using Internet standard LDAP compliant directory services.

Premises Call Manager

Referring to pseudo code listing C, appended hereto, a premises call manager receives requests from POP call managers to allocate proxy call resources at the business call center ACD on their behalf, originate a proxy call on the allocated resources and finally bridge the incoming call from the POP call manager with the ACD line. The premises call center gateway is equipped with an inbound and an outbound voice port pair. The inbound voice port receives a call from the POP call manager and the outbound port is connected to the ACD, and looks like an incoming voice line to the ACD. When the agent is ready to take the user's call, the inbound and outbound ports are bridged to pass the bi-directional conversation. It should be noted that as far as the call center ACD is concerned, such a call appears no different than if it were to be received on one of its inbound trunks.

A POP call manager requests a premises call manager to allocate a port line pair through the message ALLOCATE_PROXY_CALL. Upon receiving such a request, the premises call manager locally creates a proxy call record and allocates a voice port pair for the call by calling AllocateLinePair. If this allocation is successful, it creates a new proxy call associated with the voice port pair and the incoming call, and returns a handle to the proxy call to the invoking POP call manager. If it is unable to allocate a line pair, it returns failure, causing the invoking POP call manager to produce a busy tone to the caller.

When the POP call manager requests the premises call manager to place the proxy call to the ACD through the message PLACE_PROXY_CALL, the premises call manager places the call to the ACD, noting the ACD's call ID. It returns success to the POP call manager, setting the state of the call. The premises call manager then monitors the progress of the proxy call using the ACD's CTI interface. When the proxy call is about to be delivered to a live call center agent, the call center ACD alerts the premises call manager through the message AGENT_READY. Upon receiving the notification, the premises call manager identifies the POP call manager originally responsible for the proxy call and the matching inbound voice port using the proxy call record. The premises call manager then notifies the responsible POP call manager specifying a direct inward dialing (DID) number corresponding to the inbound voice port. Upon receiving such notification from the premises call manager, the receiving POP call manager identifies the matching queued call and dials the provided DID number to transfer it to the notifying premises call center gateway. When this call is received by the premises gateway, it appears to the premises call manager through the message INCOMING_CALL. Using the inbound voice port on which the call arrives at the premises call center gateway, the premises call manager matches it to the local proxy call record and bridges the call to the corresponding outbound voice port, by calling BridgeCall. This series of operations results in the customer call queued at the POP call center to be connected just in time to the appropriate business call center agent, as the agent becomes available. At any time during the call, if the premises call manager receives the message AGENT_TERMINATION from the ACD, it notifies the POP call manager of the event by sending the message AGENT_TERMINATION. The premises call manager may also receive a notification from the POP call manager that the user has terminated the call, through the message TERMINATE_CALL. In either case, it performs clean up of the voice port pairs and the proxy call record.

The above described techniques can be extended to accommodate multiple premises call center gateways at a single location. This is accomplished through one of the premises call center gateways acting as a master, selecting an appropriate gateway for handling an incoming call and returning that gateway address as part of processing INCOMING_CALL. Similarly, multiple POP-enabled business call center locations, each with one or more premises call center gateways can also be accommodated by one of the locations acting as the master site receiving the incoming call requests.

Voice Response Server

Referring to pseudo code listing D, appended hereto, a premises voice response server hosts interactive voice response applications including voice prompts, menus, scripts and forms customized to the local business call center. The premises voice response server connects to business call center databases 198 to access customer and business information as needed by the hosted interactive voice response applications. In one preferred embodiment, the premises voice response server dynamically down loads all or parts of the requested interactive voice response applications to the requesting POP voice response client. The voice response client requests two types of scripts, one designated by the message ANSWER_SCRIPT and the other by HOLD_SCRIPT. These scripts may perform different functions for the business call center depending on whether the phone is being answered or the call is being placed in a queue awaiting an agent. Thereafter, the voice response client requests through a generic message VRC_REQUEST, which provides sufficient context such as requesting voice response client, last script executed, and new user input. In an alternative preferred embodiment, the voice response server responds to specialized request protocols such as HTTP from remote voice user interface managers embedded in POP voice response clients distributed at POP call centers. In response to such requests, the premises voice response server supplies the requested voice prompts, menus, forms and scripts to the requesting voice user interface manager. This configuration allows the voice user interface manager embedded in the POP voice response client to adapt dynamically to the interactive voice response application customized to the business call center to which the inbound call is directed.

A premises network manager connects to the call center network for the corresponding business call center. The premises network manager initially registers with the global network directory service and creates a business call center service record for each POP call center connected to its call center network. The service record contains at a minimum the called party number at the POP call center corresponding to its business call center and the matching premises call center gateway network address. As described earlier, the POP call manager accesses this service record to identify the business call center gateway corresponding to an inbound call arriving on a particular called party number.

In a preferred embodiment, the POP call center gateway and the premises call center gateway each use two voice ports to bridge the call between the user and the long distance network, and the long distance network and the ACD. If the POP call center connects to a CTI-enabled switch, the requirement to bridge the call is eliminated in the POP call center gateway, since the POP call manager can request the switch perform a "transfer connect" through the CTI interface. Likewise, if the premises call center utilized a CTI-enabled PBX, the need to bridge the voice call at the premises is similarly eliminated.

SYSTEM MANAGEMENT

Configuration of Call Center Networks

When a business call center network is created, the POP call center network directory service entries are required to be created, as it is the configuration source to the network of all POP call centers. The business selects the participating POPs and this determines the allocation of telephone numbers local to the POP's LATA. The set of all the telephone numbers, along with area code is also registered with the SMS/800 system to enable the point of call routing of the toll-free number. The address of the premises call center gateway server is associated with each of the telephone numbers allocated for the business. This ensures that when the call arrives, the query for the address of the premises call center gateway server is correctly handled. The query is based on the local number allocated at the POP to which the SMS/800 system referred the toll-free call. Also to be registered at the directory service is the starting point Uniform Resource Locator (URL) for any HTTP based communication, such as the POP voice response client.

Management of Audio Media in the POP

The voice response client at the POP call center gateway executes voice response application scripts that are created by the business. It is expected to handle a large number of audio media files in the course of executing these voice response application scripts. When a business changes its media files the voice response client would download large amounts of data in order to replace the cached audio resources. This process should be performed when not handling a user call. Accordingly, an auxiliary media management process in the POP call center system coordinates the validation and replacement of cached files as a maintenance task within the system.

In the foregoing specification and in the following pseudo code listings which form part of the specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

---

Pseudo Code Listing A - POP Call Manager

```
POPCallManager (. . . ) {
Messages:
    [INCOMING_CALL, QUEUE_CALL, TRANSFER_CALL, AGENT_READY,
    USER_TERMINATION, AGENT_TERMINATION];
Data:
    ICR {
    POPGatewayAddress;   // Address of the POP CC Gateway
    InLineNumber;        // Unique Line number of the line within local system
    CalledPartyNumber;   // Number that was called
    CallerNumber;        // Caller's number
```

```
    PremisesGateway;     // Structure of Addresses of the Premises Servers hosting
                         // Call Manager Server & Voice response server and possibly others
    ProxyCallID;         // Id of the Proxy Call registered with Call Manager Server
    VRCInstance;         // Handle to the associated instance of Voice Response Client
    PremisesNumber;      // Number provided by Call Manager Server to transfer call
    OutLineNumber;       // Unique Line number of a line to use to transfer call
    }                    // Incoming Call Records
Program:
    Initialize( . . . );
    While ( FOREVER ) {
        Message = ReceiveMessage (. . .);
        Switch ( Message.Operation) {
        Case INCOMING_CALL:            // Request to process incoming call from the PSTN
        // Incoming Call on "LineNumber", to "CalledPartyNumber" from "CallerNumber"
        ICR = CreateIncomingCallRecord ( . . . );
        // Set ICR LineNumber, Called PartyNumber & CallerNumber to Call Values
        ICR.InLineNumber = Message.LineNumber;
        ICR.CalledPartyNumber = Message.CalledPartyNumber;
        ICR.CallerNumber = Message.CallNumber;
        // Translate Called Party Number to authoritative Premises Gateway Address
        PremisesGateway = TranslateNumberToAddress ( ICR.CalledPartyNumber, . . . );
        // Send Proxy Call Request to Premises Call Manager at PremisesGateway,
        // passing Called Party Number and Caller Number. PremisesGateway may return
        // the address of a different (available) gateway.
        ProxyCall = SendMessage ( PremisesGateway.PremisesCallManager,
                                ALLOCATE_PROXY_CALL, . . . );
        // If Proxy Call request is successful, accept the call being presented on Line Number
        // Record the returned ID & Gateway address for subsequent communication.
        If ( ProxyCall.Reply = SUCCESS ) {
            ICR.ProxyCallID = ProxyCall.ID;
            ICR.PremisesGateway = ProxyCall.PremisesGateway;
            // Create a new Voice Response Client instance and instruct it to answer call
            ICR.VRCInstance = CreateVoiceResponseClientInstance ( ICR, ANSWER, . . . );
            . . .
        } Else {
            // Respond with Number Busy on Call being Presented on LineID
            . . .
        }
        Break;
        Case QUEUE_CALL;      // Request to queue a call at Premises ACD
        // Call is identified by Incoming Call Record, ICR
        ICR = message.ICR;
        // Place this call on virtual global queue with Premises Call Manager at Premises Gateway,
        // passing ProxyCallID from ICR
        ProxyCall = SendMessage ( ICR.PremisesGateway.PremisesCallManager,
                                PLACE_PROXY_CALL, ICR.ProxyCallID, . . . );
        // ProxyCallID now has a queue position at Premises ACD
        // Create a new Voice Response Client instance and instruct it to hold the call
        ICR.VRCInstance = CreateVoiceResponseClientInstance ( ICR, HOLD, . . . );
        . . .
        Break;
        Case AGENT_READY:     // Notification that agent is ready to receive call
        // Call is identified by Proxy call identifier
        ICR = FindICRFromProxyCallID ( Message.ProxyCallID, . . . );
        // Premises Call Manager sends the appropriate Premises Number to call
        ICR.PremisesNumber = Message.PremisesNumber;
        // Request Voice Response Client Instance to relinquish call
        SendMessage ( ICR.VRCInstance, TERMINATE, . . . );
        . . .
        Break;
        Case TRANSFER_CALL:    // Request to transfer a call to Premises Call Manager
        // Call is identified by ICR
        ICR = Message.ICR;
        // Allocate an available outbound line
        ICR.OutLineNumber = AllocateLine ( );
        // Place a call on allocated line to Premises Call Manager using Premises Number
        PlaceCall (ICR.OutLineNumber, ICR.PremisesNumber, . . . );
        // When the call is accepted bridge the incoming call to outbound call
        BridgeCall (ICR.InLineNumber, ICR.OutLineNumber, . . . );
        . . .
        Break;
        Case USER_TERMINATION:    // Notification that a user has terminated a call
        // Call is identified by ICR
        ICR = Message.ICR;
        // Inform Premises Call Manager of user termination event
        SendMessage (ICR.PremisesGateway.PremisesCallManager, TERMINATE_CALL,
                                ICR.ProxyCallID, . . . );
        // Terminate call and clean up
        TerminateCall ( ICR.InLineNumber, ICR.OutLineNumber, . . . );
```

```
            DeleteIncomingCallRecord ( ICR );
            CleanUp ( );
            ...
            Break;
        Case AGENT_TERMINATION: // Notification that an agent has terminated a call
            // Call is identified Proxy call identifier
            ICR = FindICRFromProxyCallID ( Message.ProxyCallID, . . . );
            // Terminate the inbound and outbound calls and clean up
            TerminateCall ( ICR.InLineNumber, ICR.OutLineNumber, . . . );
            DeleteIncomingCallRecord (ICR);
            CleanUp ( );
            ...
            Break;
        }
}       // End POPCallManager
                        Pseudo Code Listing B - Voice Response Client VRCInstance (ICR, Operation, . . . ) {
Messages:
    [USER_INPUT, USER_HANGUP, TERMINATE];
Data:
    ICR { . . . };
    Operation: [ANSWER, HOLD];
Program:
    Initialize ( . . . );
    // Access the Voice Response Server at Premises Gateway for Starting Script
    VoiceResponseServer = ICR.PremisesGateway.VoiceResponseServer;
    If (Operation = ANSWER) {
        // If invoked to answer the call, access the answering script from Voice Response Server
        NewScript = AccessScript (VoiceResponseServer, ANSWER_SCRIPT, . . . );
    } Else {
        // If invoked to hold the call, access the hold script from Voice Response Server
        NewScript = AccessScript (VoiceResponseServer, HOLD_SCRIPT, . . . );
    }
    // Execute the accessed script on appropriate line
    Status = ExecuteScript ( ICR.LineNumber, NewScript, . . . );
    // If the call needs to be queued, inform the POP Call Manager
    If ( Status = QUEUE_CALL ) {
    SendMessage ( POPCallManager, QUEUE_CALL, . . . );
    CleanUp ( );
    Exit ( . . . );
}
While ( FOREVER ) {
    Message = Receive Message ( . . . );
    Switch ( Message.Operation ) {
    Case USER_INPUT:    // User input in the form of touch tones or speech recognition
            // Process user input and access additional scripts from Voice Response Server, if needed
            UserRequest = ProcessUserInput (Message, . . . );
            NewScript = AccessScript (VoiceResponseServer, UserRequest, . . . );
            // Execute the accessed script on appropriate line
            Status = ExecuteScript ( ICR.LineNumber, NewScript, . . . );
            //If the call needs to be queued, inform the POP Call Manager
            If (Status = QUEUE_CALL) {
                SendMessage ( POPCallManager, QUEUE_CALL, ICR, . . . );
                CleanUp ( );
                Exit ( . . . );
            }
            ...
            Break;
    Case USER_HANGUP:  // User hangs up the call
            // Inform the POP Call Manager that the user has terminated the call
            SendMessage ( POPCallManager, USER_TERMINATION, ICR, . . . );
            // Clean up and exit
            CleanUp ( . . . );
            Exit ( . . . );
    Case TERMINATE:    // POP Call Manager terminates hold sessioin
            // Transfer call back to POP Call Manager
            SendMessage ( POPCallManager, TRANSFER_CALL, ICR, . . . );
            // Clean up and exit
            CleanUp ( . . . );
            Exit ( . . . );
    }
    }
}       // End VRCInstance
                        Pseudo Code Listing C - Premises Call Manager PremisesCallManager ( . . . ) {
Messages:
    [ALLOCATE_PROXY_CALL, PLACE_PROXY_CALL, AGENT_READY, INCOMING_CALL,
```

-continued

```
    USER_TERMINATION, AGENT_TERMINATION];
Data:
    PCR {
        POPGateway;           // Address of the POP Gateway responsible for this call
        CalledPartyNumber;    // Number that was originally called by the user
        CallerNumber;         // Caller's number
        // Total number of Line pairs limit the maximum number of active calls at all POPs
        LinePair {
            InLineNumber;     // Line number on which POP Gateway call arrives
            OutLineNumber;    // Line number on which ACD call is placed
        };                    // Lines are allocated in pairs.
        ProxyCallStatus;      // Status of the proxy call in Premises Call Manager
        ProxyCallID,          // ID of the proxy call that is provided to the POP call manager
        ACDCallStatus;        // Status of the proxy call in the ACD
        ACDInLineNumber;      // ACD Line number on which outbound call is placed
        ACDCallID;            // ACD Call handle
    } // Proxy Call Record
Program:
    Initialize ( . . . );
    While ( FOREVER ) {
        Message = ReceiveMessage ( . . . );
        Switch ( Message.Operation ) {
        Case ALLOCATE_PROXY_CALL:   // Request from a POP for a proxy call allocation
            // Allocate a line pair. There must be as many line pairs as there are inbound ACD ports
            // If successful, then create proxy call record and assign the line pair to it. AllocateLinePair
            // could be extended to return the address of an available premises call center
            // gateway if this gateway does not have available line pairs.
            Status = AllocateLinePair ( LinePair, . . . );
            If ( Status = SUCCESS ) {
                // Proxy call indentifier is assigned to the proxy call record
        PCR = CreateProxyCallRecord (. . . );
        // Assign allocated line pair to proxy call record
        PCR.LinePair = LinePair;
        // Assign POP Gateway address, Called Party Number and Caller Number to Proxy
        // Call record
        PCR.POPGateway = Message.POPGateway;
        PCR.CalledPartyNumber = Message.CalledPartyNumber;
        PCR.CallerNumber = Message.CallerNumber;
        PCR.ProxyCallID = &PCR;   // address handle to PCR
        // Reply to POP Call Manager indicating success and pass Proxy call identifier
        SendMessage ( PCR.POPGateway.POPCallManager, SUCCESS,
                      PCR.ProxyCallID, . . . );
        PCR.ProxyCallStatus = ALLOCATED;
    } Else { // Reply to POP Call Manager indicating rejection of incoming call
        SendMessage (Message.POPGateway.POPCallManager, FAILURE, . . . );
    }
    . . .
    Break;
Case PLACE_PROXY_CALL:   // Place a proxy call to the ACD on behalf of requesting POP
    // Call is identified by PCR which is identified by the Proxy call indentifier
    PCR = FindPCRFromProxyCallID ( Message.ProxyCallID, . . . );
    // Place a proxy call to ACD on Out Line Number assigned to Proxy Call Record
    ProxyCall = PlaceProxyCall ( PCR.LinePair.OutLineNumber, . . . );
    // Set Proxy Call Record ACD call identifier and Line Number
    PCR.ACDCallID = ProxyCall.ACDCallID;
    PCR.ACDInLineNumber = ProxyCall.ACDInLineNumber;
    // Reply to POP Call Manager indicating successful queuing of call at ACD
    SendMessage ( PCR.POPGateway.POPCallManager, SUCCESS, PCR.ProxyCallID, . . . );
    PCR.ProxyCallStatus = QUEUED;
    . . .
    Break;
Case AGENT_READY;    // Notification from ACD that the agent is ready to take call
    // Call is identified by PCR which is identified by ACD inbound line number
    PCR = FindPCRFromACDInLineNumber ( Message.ACDInLineNumber, . . . );
    // Translate inbound line number to phone number to be called for transfer of call
    PremisesNumber = TranslateLineToPhoneNumber ( PCR.LinePair.InLineNumber );
    // Signal POP Call Manager that agent is ready to accept call on DID, PremisesNumber
    SendMessage ( PCR.POPGateway.POPCallManager, AGENT_READY,
                  PCR.ProxyCallID, PremisesNumber );
    PCR.ProxyCall;Status = AGENT_READY;
    . . .
    Break;
Case INCOMING_CALL;   // Request to process an incoming call from POP Gateway
    // Call is identified by PCR which is defined by inbound line number
    // Call can only be from the authorized POP Gateway
    PCR = FindPCRFromInLineNumber ( Message.InLineNumber, . . . );
    // Bridge the call from POP Gateway to ACD proxy call
    BridgeCall (PCR.LindPair.InLineNumber, PCR.LinePair.OutLineNumber, . . . );
    // Reply to POP Call Manager indicating successful bridging of call to ACD
```

-continued

```
    SendMessage ( PCR.POPGateway.POPCallManager, SUCCESS, PCR.ProxyCallID, . . . );
    PCR.ProxyCallStatus = ACTIVE;
    . . .
    Break;
Case USER_TERMINATION:   // Notification that a user terminated a call
    // Call is identified by PCR which is identified by Proxy call identifier
    PCR = FindPCRFromProxyCallID ( Message.ProxyCallID, . . . );
    // Terminate the call at ACD and clean up
    TerminateCall (PCR.ACDInLineNumber, . . . );
    DeleteProxyCallRecord ( PCR );
    CleanUp ( );
    . . .
    Break;
Case AGENT_TERMINATION: // Notification that an agent terminated a call
    // Call is identified by PCR which is identified by ACD inbound line number
    PCR = FindPCRFromACDInLineNumber ( Message.ACDInLineNumber, . . . );
    // Signal POP Call Manager that agent has terminated call
    SendMessage ( PCR.POPGateway.POPCallManager, AGENT_TERMINATION,
                PCR.ProxyCallID, . . . );
    // Terminate the call at ACD and clean up
    TerminateCall (PCR.ACDInLineNumber, . . . );
    DeleteProxyCallRecord ( PCR );
    CleanUp ( );
    . . .
    Break;
    }
  }
}   // End PremisesCallManager
```

Pseudo Code Listing D - Voice Response Server

```
VoiceResponseServer (. . . ) {
Messages:
    [ANSWER_SCRIPT, HOLD_SCRIPT, VRC_REQUEST];
Data:
Program:
    Initialize ( . . . );
    While ( FOREVER ) {
        Message = ReceiveMessage ( . . . );
        Switch ( Message.Operation ) {
        Case ANSWER_SCRIPT: // Request for starting script for answering a call
            // Voice Response Client instance is identified by message
            VRCInstance = Message.VRCInstance;
            // Access the starting script for answering a call and send it to VRC instance
            NewScript = AccessScript ( ANSWER_SCRIPT, . . . );
            SendMessage ( VRCInstance, NewScript, . . . );
            . . .
            Break;
        Case HOLD_SCRIPT:     // Request for starting script for servicing a call during hold
            // Voice Response Client instance is identified by message
            VRCInstance = Message.VRCInstance;
            // Access the starting script for servicing a call on hold and send it to VRC instance
            NewScript = AccessScript ( HOLD_SCRIPT, . . . );
            SendMessage (VRC Instance, NewScript, . . . );
            . . .
            Break;
        Case VRC_REQUEST;    // Request for a script based on current user interaction
            // Voice Response Client instance is identified by message
            VRCInstance = Message.VRCInstance;
            // Access the script for servicing the user request and send it to VRC instance
            NewScript = AccessScript ( Message.UserRequest, . . . );
            SendMessage ( VRCInstance, NewScript, . . . );
            . . .
            Break;
        }
    }
}     // End VoiceResponseServer
```

What is claimed is:

1. A method, comprising:

redirecting a telephone call that is directed to a remote call center to a local call center;

automatically answering the redirected telephone call in the local call center to determine whether connection to the remote call center is necessary; and bridging the redirected telephone call with a telephone connection in the remote call center via a telecommunication network adaptable to be coupled between the local call center and the remote call center if connection to the remote call center is necessary.

2. The method of claim 1 further comprising signaling the remote call center via a data network between the local call center and the remote call center to request the telephone connection to be established in the remote call center if connection to the remote call center is necessary.

3. The method of claim 1 wherein redirecting the telephone call from the remote call center to the local call center comprises translating a telephone number associated with the inbound telephone call to a translated number that terminates at the local call center.

4. The method of claim 1 wherein bridging the redirected telephone call with the telephone connection in the remote call center comprises:
   determining when the telephone connection in the remote call center is imminent; and
   forwarding the redirected telephone call to the remote call center via the communication network to be bridged with the telephone connection in the remote call center in response to determining that the telephone connection in the remote call center is imminent.

5. The method of claim 4 wherein determining when the telephone connection in the remote call center is imminent comprises the local call center receiving a signal from the remote call center via a data network coupled between the local call center and the remote call center, the signal indicating that the telephone connection in the remote call center is imminent.

6. The method of claim 4 further comprising storing an entry in a queue in the remote call center to indicate the request for the telephone connection to be established in the remote call center, and wherein determining when the telephone connection in the remote call center is imminent comprises determining when the entry in the queue in the remote call center has advanced to the head of the queue.

7. The method of claim 1 wherein automatically answering the redirected telephone call in the local call center to determine whether connection to the remote call center is necessary comprises:
   automatically answering the call using an automated call answering system; and
   executing an interactive application in the automated call answering system to interact with a caller.

8. The method of claim 7 further comprising downloading at least a portion of the interactive application from the remote call center to the local call center via a data network coupled between the local call center and the remote call center.

9. The method of claim 1 wherein bridging the redirected telephone call with the telephone connection in the remote call center via a communication network comprises bridging the redirected telephone call with the telephone connection in the remote call center via a voice communication channel established over a data network coupled between the local call center and the remote call center.

10. A distributed telephone call servicing system comprising:
   a remote call center configured to service telephone calls; and
   a local call center configured to automatically answer telephone calls that have been redirected from the remote call center to the local call center, the local call center being further configured to determine, for each redirected telephone call, whether connection to the remote call center is necessary and, if connection to the remote call center is necessary, to bridge the redirected telephone call with a telephone connection in the remote call center via a communication network coupled between the local call center and the remote call center.

11. The system of claim 10 further comprising a data network coupled between the local call center and the remote call center, the local call center being further configured to signal the remote call center via the data network to request the telephone connection to be established in the remote call center if connection to the remote call center is necessary.

12. The system of claim 11 wherein the data network is a virtual private network that provides industry standard connection and transport protocols.

13. The system of claim 11 wherein the data network between the local call center and the remote call center forms the communication network used to bridge the redirected toll free call with the telephone connection in the remote call center.

14. The system of claim 11 further comprising a database of network addresses coupled to the local call center via the data network, the local call center being configured to access the database of network addresses to determine a network address of the remote call center in response to answering a telephone call that has been redirected from the remote call center to the local call center.

15. The system of claim 14 wherein the local call center indexes the database of network addresses based on a phone number generated by translating a telephone number assigned to the remote call center.

16. The system of claim 15 wherein the phone number generated by translating the telephone number assigned to the remote call center is a telephone number assigned to the local call center.

17. The system of claim 10 wherein the local call center includes an automated call answering system that executes an interactive application to interact with respective callers of the redirected telephone calls.

18. The system of claim 17 further comprising a data network coupled between the local call center and the remote call center, the local call center being further configured to download at least a portion of the interactive application from the remote call center via the data network.

19. A distributed telephone call servicing system comprising:
   a remote call center configured to service telephone calls; and
   a plurality of local call centers that are distributed within respective service regions, each configured to automatically answer telephone calls that originate within the local call center's respective service region, each of the telephone calls being redirected from the remote call center to one of the plurality of local call centers selected according to the service region from which the telephone call originated, the selected one of the plurality of local call centers being configured to determine, for each redirected telephone call received, whether connection to the remote call center is necessary and, if connection to the remote call center is necessary, to bridge the redirected telephone call with a telephone connection in the remote call center via a communication network between the local call center and the remote call center.

20. The system of claim 19 further comprising a data network interconnecting each of the plurality of local call centers with the remote call center, the selected one of the plurality of local call centers being further configured to signal the remote call center via the data network to request the telephone connection to be established in the remote call center if connection to the remote call center is necessary.

21. The system of claim 20 wherein the data network is a virtual private network that provides industry standard connection and transport protocols.

22. The system of claim 20 wherein the data network interconnecting the plurality of local call centers with the remote call center forms the communication network used to bridge the redirected toll free call with the telephone connection in the remote call center.

23. The system of claim 19 wherein each of the plurality of local call centers includes an automated call answering system that executes an interactive application to interact with respective callers of the redirected telephone calls.

24. The system of claim 23 further comprising a data network interconnecting each of the plurality of local call centers with the remote call center, at least one of the plurality of local call centers being configured to download at least a portion of the interactive application from the remote call center via the data network.

25. The system of claim 19 wherein the service regions correspond to geographic regions.

26. The system of claim 19 wherein the service regions are local access network service regions.

27. The system of claim 26 wherein at least one of the local access network service regions is served by a wireless access network.

28. The system of claim 26 wherein at least one of the local access network service regions is served by a data access network.

29. The system of claim 26 wherein at least one of the local access network service regions is served by a digital subscriber line access network.

30. The system of claim 19 wherein at least one of the service regions is served by a long distance access network.

31. A telephone call handling system comprising:

a telephony switch to receive telephone calls that have been redirected to the call handling system by a local access network;

a computer telephony server coupled to the telephony switch to detect when a redirected telephone call is received in the telephony switch and to automatically answer the redirected telephone call to determine whether connection to a remote call center is necessary, the computer telephony server being configured to bridge the redirected telephone call with a telephone connection in the remote call center via a communication network adaptable to be coupled between the local call center and the remote call center if connection to the remote call center is necessary.

32. The call handling system of claim 31 wherein the communication network is a data network.

33. The call handling system of claim 31 wherein the communication network is a wireless network.

34. The call handling system of claim 31 wherein the computer telephony server is configured to issue a request to the remote call center to initiate a proxy call in the remote call center, the proxy call being a request for connection to a human operator that is managed within the remote call center without a long distance voice connection being established between the remote call center and the call handling system.

35. The call handling system of claim 34 wherein the computer telephony server is further configured to receive communications via a data network indicating progress of the proxy call in the remote call center and wherein the computer telephony server is further configured to bridge the redirected telephone call with a telephone connection in the remote call center by bridging the redirected telephone call with the proxy call in response to detecting that the proxy call is about to be answered by a human operator.

* * * * *

UNITED STATES PATENT AND TRADEMARK OFFICE
CERTIFICATE OF CORRECTION

| | | |
|---|---|---|
| PATENT NO. | : 6,445,784 B2 | Page 1 of 1 |
| APPLICATION NO. | : 09/796060 | |
| DATED | : September 3, 2002 | |
| INVENTOR(S) | : Prem Uppaluru et al. | |

It is certified that error appears in the above-identified patent and that said Letters Patent is hereby corrected as shown below:

On the Title Page:
Please insert item (60) as follows:

-- (60) Provisional application No. 60/090,091, filed on Jun. 19, 1998. --

In the Specification:
Replace column 1, lines 5-9, with the following:

-- This application is a continuation-in-part of application Ser. No. 09/433,636 filed Nov. 3, 1999, now U.S. Pat. No. 6,324,276, which is a continuation of application Ser. No. 09/249,395, filed Feb. 12, 1999, now U.S. Pat. No. 6,011,844, which claims the benefit of provisional application Ser. No. 60/090,091, filed on Jun. 19, 1998. --

Signed and Sealed this
Seventeenth Day of February, 2015

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 6,445,784 B2 |
| APPLICATION NO. | : 09/796060 |
| DATED | : September 3, 2002 |
| INVENTOR(S) | : Prem Uppaluru et al. |

It is certified that error appears in the above-identified patent and that said Letters Patent is hereby corrected as shown below:

This certificate supersedes the Certificate of Correction issued on February 17, 2015. The certificate which issued on February 17, 2015 is vacated because an unintentionally delayed claim for the benefit of a prior filed provisional application under 37 CFR 1.78 (c) was not accepted. Petition to accept the delayed claim for the benefit was not granted. The Certificate of Correction which issued on February 17, 2015 was published in error and should not have been issued for this patent.

Signed and Sealed this
Fourth Day of August, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 6,445,784 B2 | Page 1 of 1 |
| APPLICATION NO. | : 09/796060 | |
| DATED | : September 3, 2002 | |
| INVENTOR(S) | : Prem Uppaluru et al. | |

It is certified that error appears in the above-identified patent and that said Letters Patent is hereby corrected as shown below:

On the Title Page:
Please insert item (60) as follows:

-- (60) Provisional application No. 60/090,091, filed on Jun. 19, 1998. --

In the Specification:
Replace column 1, lines 5-9, with the following:

-- This application is a continuation-in-part of application Ser. No. 09/433,636 filed Nov. 3, 1999, now U.S. Pat. No. 6,324,276, which is a continuation of application Ser. No. 09/249,395, filed Feb. 12, 1999, now U.S. Pat No. 6,011,844, which claims the benefit of provisional application Ser. No. 60/090,091, filed on Jun. 19, 1998. --

Signed and Sealed this
First Day of December, 2015

Michelle K. Lee
*Director of the United States Patent and Trademark Office*